United States Patent
Huang et al.

(10) Patent No.: US 8,045,119 B2
(45) Date of Patent: Oct. 25, 2011

(54) ACTIVE DEVICE ARRAY SUBSTRATE

(75) Inventors: Chin-Hai Huang, Taipei County (TW);
Huei-Chung Yu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 891 days.

(21) Appl. No.: 12/049,391

(22) Filed: Mar. 17, 2008

(65) Prior Publication Data

US 2008/0265250 A1 Oct. 30, 2008

(30) Foreign Application Priority Data

Apr. 27, 2007 (TW) .............................. 96115026 A

(51) Int. Cl.
G02F 1/1333 (2006.01)
G02F 1/1345 (2006.01)
G01R 27/08 (2006.01)

(52) U.S. Cl. .......... 349/149; 349/40; 349/150; 349/152; 324/760.02

(58) Field of Classification Search .................... 349/40; 324/760.01, 760.02
See application file for complete search history.

(56) References Cited

U.S. PATENT DOCUMENTS

| 5,936,687 | A | 8/1999 | Lee |
| 6,043,971 | A | 3/2000 | Song et al. |
| 7,372,514 | B2 * | 5/2008 | Matsumoto et al. ............ 349/55 |
| 7,456,647 | B2 * | 11/2008 | Jeon et al. ................ 324/760.01 |
| 7,782,411 | B2 * | 8/2010 | Shie .................. 349/40 |
| 2007/0290375 | A1 * | 12/2007 | Huang ......................... 257/786 |
| 2008/0204618 | A1 * | 8/2008 | Jung et al. ...................... 349/40 |

FOREIGN PATENT DOCUMENTS

| JP | 09329796 | 12/1997 |
| JP | 2001166327 | 6/2001 |
| JP | 2005122209 | 5/2005 |

* cited by examiner

*Primary Examiner* — Michelle R Connelly Cushwa
(74) *Attorney, Agent, or Firm* — Jianq Chyun IP Office

(57) ABSTRACT

An active device array substrate including a substrate, an active device array, an detecting circuit, a plurality of driver chip pads, a plurality of flexible printed circuit (FPC) pads, a plurality of connection lines and an inner shorting ring is provided. The active device array and the detecting circuit are disposed on the substrate, and the detecting circuit is electrically connected to the active device array. The driver chip pads and the FPC pads are disposed on the substrate, wherein the driver chip pads are electrically connected to the active device array. The connection lines are disposed on the substrate, and each of the connection lines is respectively connected to the detecting circuit and the corresponding FPC pad. The inner shorting ring is disposed on the substrate, and the inner shorter ring is respectively electrically connected to the corresponding FPC pad and the active device array.

5 Claims, 5 Drawing Sheets

ACTIVE DEVICE ARRAY SUBSTRATE

CROSS-REFERENCE TO RELATED APPLICATION

This application claims the priority benefit of Taiwan application serial no. 96115026, filed on Apr. 27, 2007. The entirety the above-mentioned patent application is hereby incorporated by reference herein and made a part of specification.

BACKGROUND OF THE INVENTION

1. Field of the Invention

The present invention generally relates to an active device array substrate, and more particularly, to an active device array substrate for liquid crystal displays (LCDs).

2. Description of Related Art

The rapid development of the multimedia technology in modern age is largely attributed to the progress in the semiconductor devices and display apparatuses. In terms of displays, an LCD has played a major role in the mainstream display market due to advantages of high display quality, high space utilization, low power consumption and no radiation.

A thin film transistor liquid crystal display module (TFT-LCD module) mainly comprises an LCD panel and a backlight module, wherein the LCD panel usually comprises a TFT array substrate, a color filter substrate and a liquid crystal layer disposed between the above-mentioned two substrates, while the backlight module is for providing a planar light source required by the LCD panel to enable the LCD module to display.

A TFT array substrate can be divided into a display region and a peripheral circuit region, wherein a plurality of pixel elements arranged in an array on the display region and each pixel element includes a TFT and a pixel electrode electrically connected to the TFT. In addition, a plurality of scan lines and a plurality of data lines are disposed on the peripheral circuit region and the display region, wherein the TFT of each pixel element is controlled by the corresponding scan line and data line.

Whenever completing a process of TFT array substrate, an electric testing is usually conducted on the pixel elements on the TFT array substrate to decide whether the pixel elements can properly work or not. When a pixel element is found out of order, a repair process would be started on the defected device (for example, a defected TFT or a defected pixel electrode) or the circuit.

Usually a probe is used to perform an electric testing on the peripheral circuit. In more detail, the peripheral circuit is equipped with a plurality of testing pads electrically connected to the scan lines and data lines. During testing, the probe contacts each testing pad and produces a testing signal, according to which the pixel element can be decided for order or disorder. In order to increase the testing efficiency, a probe testing apparatus based on 6-probes testing architecture was developed by Photon Dynamics Inc. (PDI). When a probe testing apparatus of the PDI is used to test a panel having chip on glass (COG) design, only six testing lines are used for connecting the TFT array to a detecting circuit. Therefore, once an electrostatic discharge (ESD) occurs, except for an inner shorting ring, there is no other transmission paths for releasing the static charges, which likely causes a damage on the circuit.

SUMMARY OF THE INVENTION

Accordingly, the present invention is directed to provide an active device array substrate to protect the circuit from ESD damage.

As embodied and broadly described herein, the present invention provides an active device array substrate, which includes a substrate, an active device array, a detecting circuit, a plurality of driver chip pads, a plurality of flexible printed circuit pads, a plurality of connection lines and an inner shorting ring, wherein the active device array and the detecting circuit are disposed on the substrate, and the detecting circuit is electrically connected to the active device array. The driver chip pads and the flexible printed circuit pads are disposed on the substrate, wherein the driver chip pads are electrically connected to the active device array. The connection lines respectively connect to the corresponding flexible printed circuit pad and the detecting circuit. The inner shorting ring is disposed on the substrate and respectively connects to the active device array and the corresponding flexible printed circuit pads.

In an embodiment of the present invention, the active device array substrate further includes a plurality of unidirectional switch components which are disposed between a part of the flexible printed circuit pads and the connection lines, and respectively connect each of the flexible printed circuit pads to a corresponding connection line. Each of the unidirectional switch components includes a gate electrode, a source electrode and a drain electrode, wherein the gate electrode is electrically connected to a corresponding flexible printed circuit pad, the source electrode is electrically connected to the gate electrode and the drain electrode is electrically connected to the corresponding connection line.

In an embodiment of the present invention, the detecting circuit includes a plurality of testing pads and a plurality of testing lines electrically respectively connected to the testing pads, wherein the testing pads include even scan line testing pads, odd scan line testing pads, even data line testing pads, odd data line testing pads and switch testing pads.

To solve the above-mentioned problem, the present invention provides an active device array substrate, which includes a substrate, an active device array, a plurality of driver chip pads, a plurality of flexible printed circuit pads, a plurality of connection lines and an inner shorting ring, wherein the active device array is disposed on the substrate. The driver chip pads, the flexible printed circuit pads and connection lines are disposed on the substrate, wherein the driver chip pads are electrically connected to the active device array. The connection lines are respectively connected to each of the flexible printed circuit pads and extended to an edge of the substrate. The inner shorting ring is disposed on the substrate and is respectively connected to the active device array and at least one of the flexible printed circuit pads.

In an embodiment of the present invention, the active device array substrate further includes a plurality of unidirectional switch components respectively electrically connected to a part of the flexible printed circuit pads and an edge of the substrate. Each of the uni-directional switch components includes a gate electrode, a source electrode and a drain electrode, wherein the gate electrode is electrically connected to any one of the connection lines, the source electrode is electrically connected to the gate electrode and the drain electrode is electrically connected to the connection lines.

To solve the above-mentioned problem, the present invention provides an active device array substrate, which includes a substrate, a plurality of active device arrays, a detecting circuit, a plurality of driver chip pads, a plurality of flexible printed circuit pads, a plurality of connection lines and an inner shorting ring, wherein the substrate is divided into a plurality of panel regions, the active device arrays are respectively disposed on the panel regions, the detecting circuit is electrically connected to the active device arrays, the driver chip pads are respectively disposed on the panel regions and respectively electrically connected to any one of the active device arrays, the flexible printed circuit pads are respectively disposed on the panel regions, the connection lines are respectively disposed on the panel regions and each connection line is respectively connected to any one of the flexible printed circuit pads on each panel region and to the detecting circuit, and the inner shorting rings are respectively disposed on the panel regions and each inner shorting ring is electrically connected to the active device array on the same panel region and to at least one of the flexible printed circuit pads on the same panel region.

In an embodiment of the present invention, the active device array substrate further includes a plurality of uni-directional switch components disposed between a part of the flexible printed circuit pads and the connection lines. Each uni-directional switch component is connected to any one of the flexible printed circuit pads and any one of the connection lines. Each of the uni-directional switch components includes a gate electrode, a source electrode and a drain electrode, wherein the gate electrode is electrically connected to any one of the flexible printed circuit pads, the source electrode is electrically connected to the gate electrode and the drain electrode is electrically connected to the connection line.

In an embodiment of the present invention, the detecting circuit includes a plurality of testing pads and a plurality of testing lines respectively electrically connected to the testing pads, wherein the testing pads include an even scan line testing pad, an odd scan line testing pad, an even data line testing pad, an odd data line testing pad and a switch testing pad.

Based on the above described, the present invention enables the active device array to be electrically connected to the detecting circuit through the inner shorting ring, the flexible printed circuit pads and the connection lines. In this way, the detecting circuit is able to serve as an outer shorting ring to protect the circuit from ESD damage.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
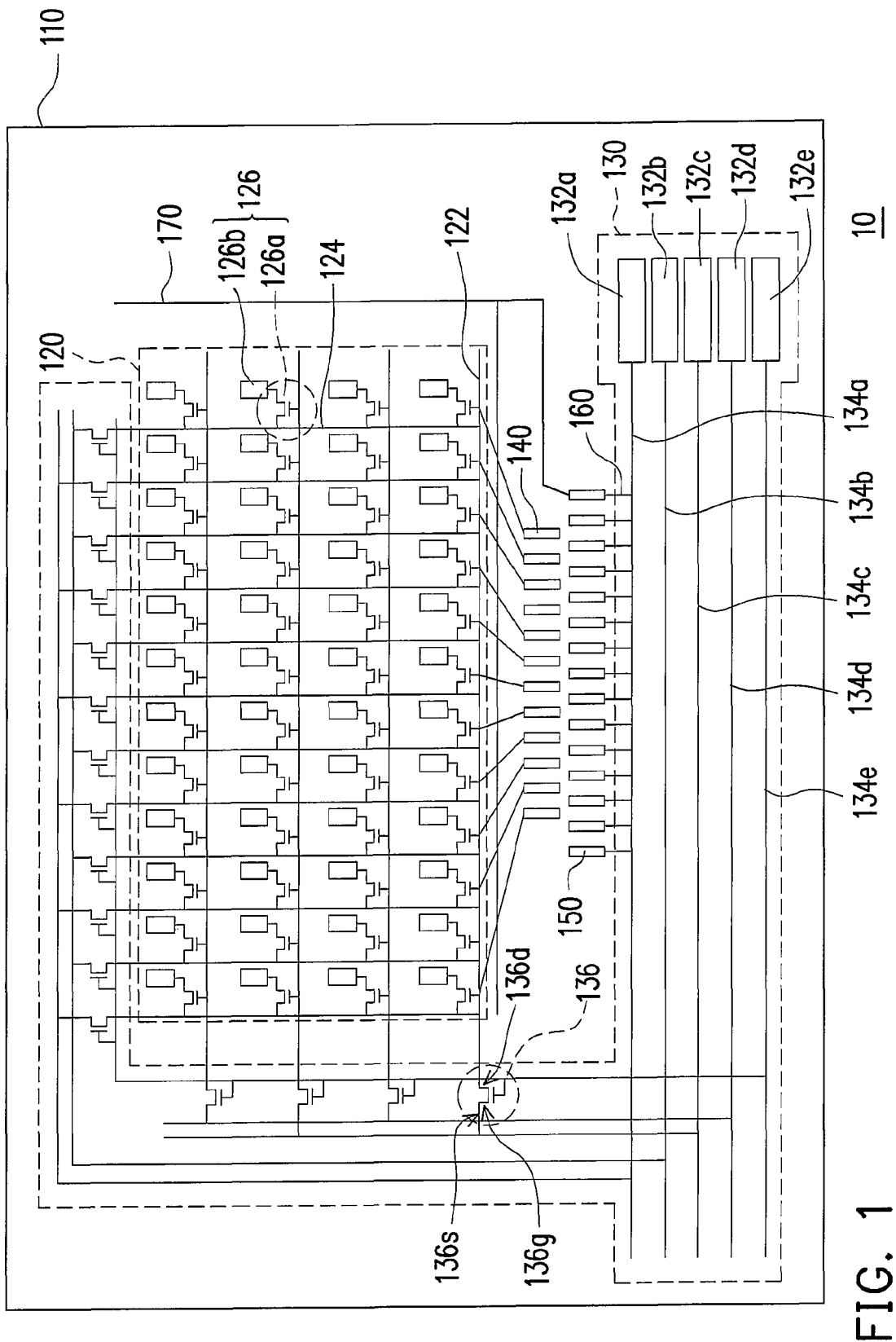
FIG. 1 is a schematic diagram of an active device array substrate prior to being cut off according to the first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The First Embodiment

FIG. 1 is a schematic diagram of an active device array substrate prior to being cut off according to the first embodiment of the present invention. Referring to FIG. 1, an active device array substrate 10 of the embodiment includes a substrate 110, an active device array 120, a detecting circuit 130, a plurality of driver chip pads 140, a plurality of flexible printed circuit pads (FPC pads) 150, a plurality of connection lines 160 and an inner shorting ring 170, wherein the material of the substrate 110 can be glass, quartz or other transparent materials. The active device array 120 is disposed on the substrate 110 and the active device array 120 includes a plurality of scan lines 122, a plurality of data lines 124 and a plurality of pixel structures 126, wherein each pixel structure 126 is controlled by the corresponding scan line 122 and data line 124. In addition, each pixel structure 126 includes an active device 126a and a pixel electrode 126b, wherein the active device 126a is electrically connected to the scan line 122 and the data line 124, while the pixel electrode 126b is electrically connected to the active device 126a. In the embodiment, the active device 126a is a TFT, but the active device 126a can be a bipolar junction transistor (BJT) or other active devices with three terminals as well.

The detecting circuit 130 is disposed on the substrate 110 and electrically connected to the active device array 120. In more detail, the detecting circuit 130 includes a plurality of testing pads 132a, 132b, 132c, 132d and 132e, and a plurality of testing lines 134a, 134b, 134c, 134d and 134e which are respectively electrically connected to the testing pads 132a, 132b, 132c, 132d and 132e, wherein the testing line 134a is electrically connected to the testing pad 132a and the testing line 134a is connected to an odd data line 124; the testing line 134b is electrically connected to the testing pad 132b and the testing line 134b is connected to an even data line 124; the testing line 134c is electrically connected to the testing pad 132c and the testing line 134c is connected to an odd scan line 122; the testing line 134d is electrically connected to the testing pad 132d and the testing line 134d is connected to an even scan line 122; the testing line 134e is electrically connected to the testing pad 132e. In other words, the testing pads 132a, 132b, 132c, 132d and 132e include an even scan line testing pad, an odd scan line testing pad, an even data line testing pad, an odd data line testing pad and a switch testing pad.

In more detail, the detecting circuit 130 further includes a plurality of switch components 136 controlled by the testing line 134e. In addition, the switch components 136 are respectively connected between the testing lines 134a, 134b, 134c, 134d and 134e and the active device array 120. Each switch component 136 includes a gate electrode 136g, a source electrode 136s and a drain electrode 136d, wherein the gate electrode 136g is electrically connected to the testing line 134e, the source electrode 136s is electrically connected to any one of the testing lines 134a, 134b, 134c and 134d, while the drain electrode 136d is connected to the scan lines 122 or the data lines 124 of the active device array 120.

The driver chip pads 140 are disposed on the substrate 110 and are electrically connected to the active device array 120. In more detail, a driver chip (not shown) is disposed on the driver chip pads 140 to control the active device array 120. In addition, the driver chip is bonded to the driver chip pads 140 in chip on glass (COG). Note that the active device array substrate 10 usually has a plurality of sets of driver chip pads 140, but for simplicity, the embodiment shows a set of driver chip pads 140 herein only.

The FPC pads 150 are disposed on the substrate 110 and each flexible printed circuit (not shown) is electrically connected to the FPC pads 150. In addition, the flexible printed circuit is further connected to a control circuit board (not shown) which is for controlling the driver chip disposed on the driver chip pads 140 and the driver chip is for controlling the active device array 120. The connection lines 160 are disposed on the substrate 110 and each of the connection lines 160 is respectively connected to any of the FPC pads 150 and the detecting circuit 130. In more detail, each of the connection lines 160 can be connected to the testing line 134a. The inner shorting ring 170 is disposed on the substrate 110 and respectively electrically connected to the active device array 120 and any one of the FPC pads 150.

Since the inner shorting ring 170 is electrically connected to the FPC pads 150 and the FPC pads 150 are electrically connected to the detecting circuit 130 via the connection lines 160, therefore, when an electrostatic discharge (ESD) occurs in the active device array 120, the ESD current is able to flow into the detecting circuit 130 via the inner shorting ring 170, the FPC pads 150 and the connection lines 160, which is able to protect the circuit from ESD damage. In other words, the detecting circuit 130 also serves as an outer shorting ring.

Figure 2:
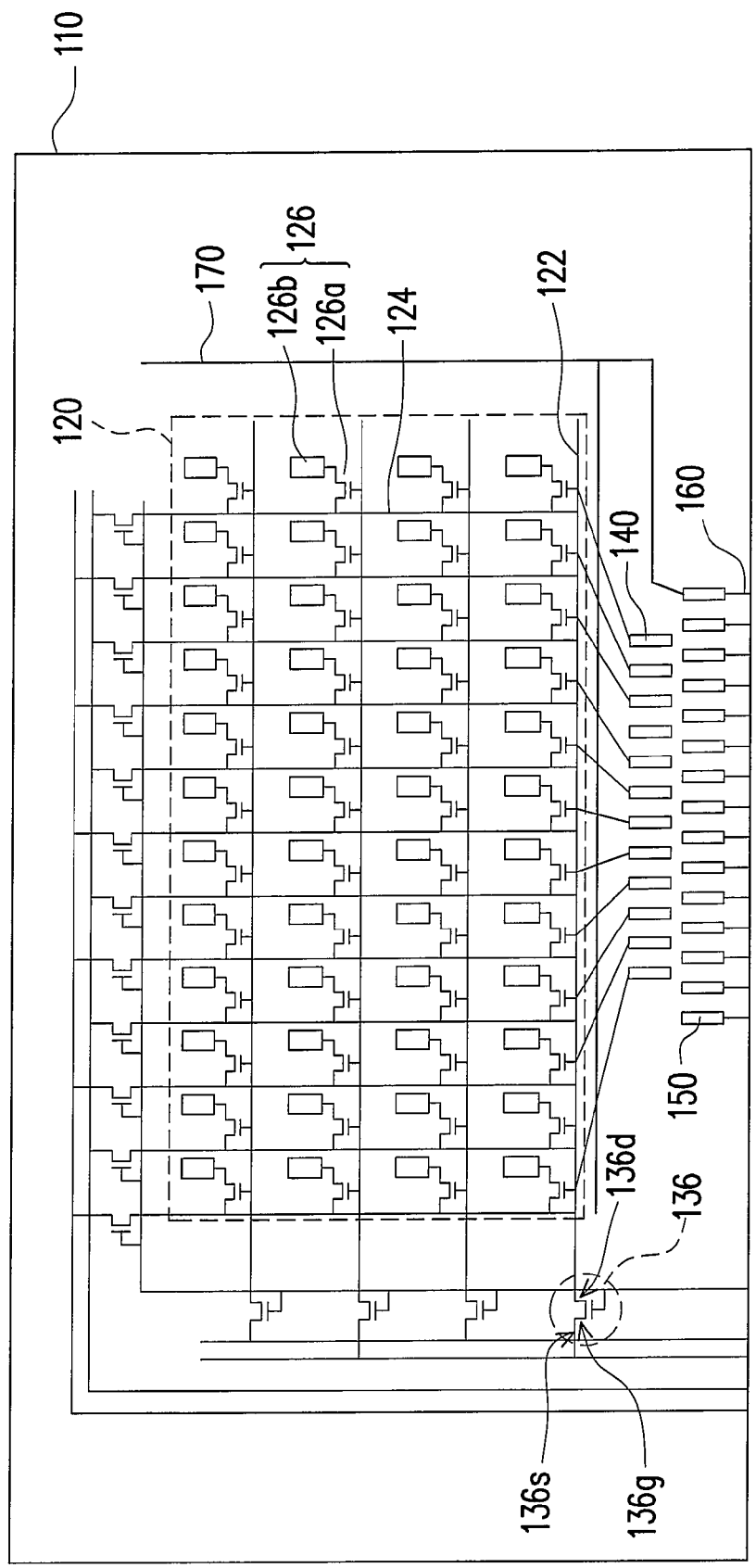
FIG. 2 is a schematic diagram of an active device array substrate after being cut off according to the first embodiment of the present invention.

FIG. 2 is a schematic diagram of an active device array substrate after being cut off according to the first embodiment of the present invention. Referring to FIGS. 1 and 2, after completing a test, the connection lines 160 would be cut off to finally form the active device array substrate 10, and at the point, the connection lines 160 extend to an edge of the substrate 110.

The Second Embodiment

Figure 3:
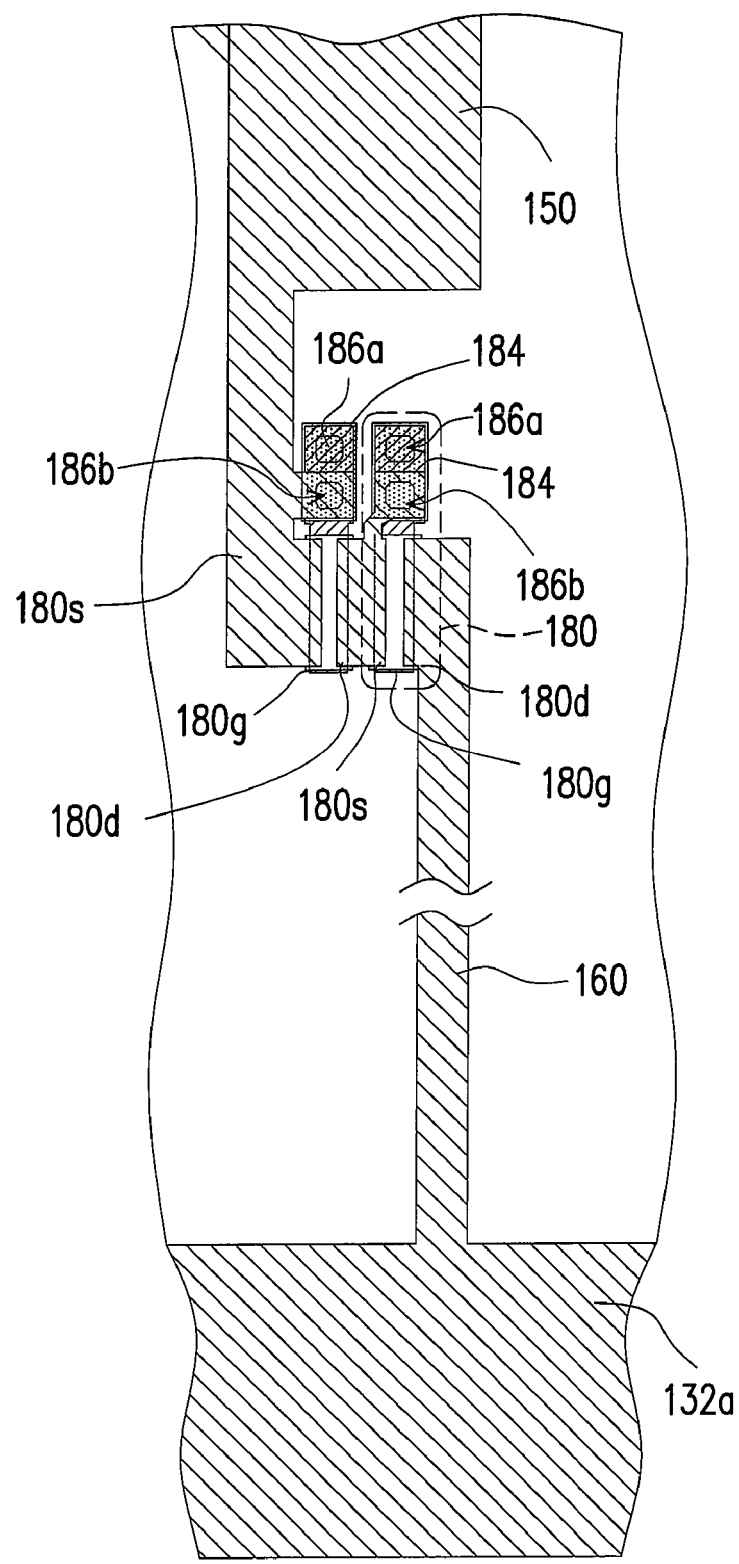
FIG. 3 is a locally-enlarged schematic diagram of an active device array substrate prior to being cut off according to the second embodiment of the present invention.

FIG. 3 is a locally-enlarged schematic diagram of an active device array substrate prior to being cut off according to the second embodiment of the present invention. Referring to FIG. 3, the present embodiment is similar to the first embodiment except that in order to prevent the operation of the active device array 120 from an interference of the testing signal, the active device array substrate of the embodiment further includes a plurality of uni-directional switch components 180 disposed between a part of the FPC pads 150 and the connection lines 160, and each uni-directional switch component 180 is connected to the FPC pads 150 and the connection lines 160.

Each unidirectional switch component 180 includes a gate electrode 180g, a source electrode 180s and a drain electrode 180d, wherein the gate electrode 180g is electrically connected to any one of the FPC pads 150, the source electrode 180s is electrically connected to the gate electrode 180g and the drain electrode 180d is electrically connected to the connection lines 160. In the embodiment, a part of the FPC pads 150 is electrically connected to the connection lines 160 via two uni-directional switch components 180. However, the present embodiment can also be implemented by using a single unidirectional switch component 180. In more detail, each uni-directional switch component 180 further includes a semiconductor layer 182 and a transparent conductor layer 184, wherein the semiconductor layer 182 is disposed over the gate electrode 180g. In addition, the source electrode 180s is electrically connected to the gate electrode 180g via via holes 186a and 186b and the transparent conductor layer 184.

Since the uni-directional switch components 180 are disposed between the part of the FPC pads 150 and the connection lines 160, therefore, during testing, the testing signal has less possibility to interfere with the operation of the active device array 120. In addition, when an electrostatic discharge (ESD) occurs, the ESD current is able to directly flow into the detecting circuit 130 via the uni-directional switch components 180 to protect the active device array 120 from ESD.

Figure 4:
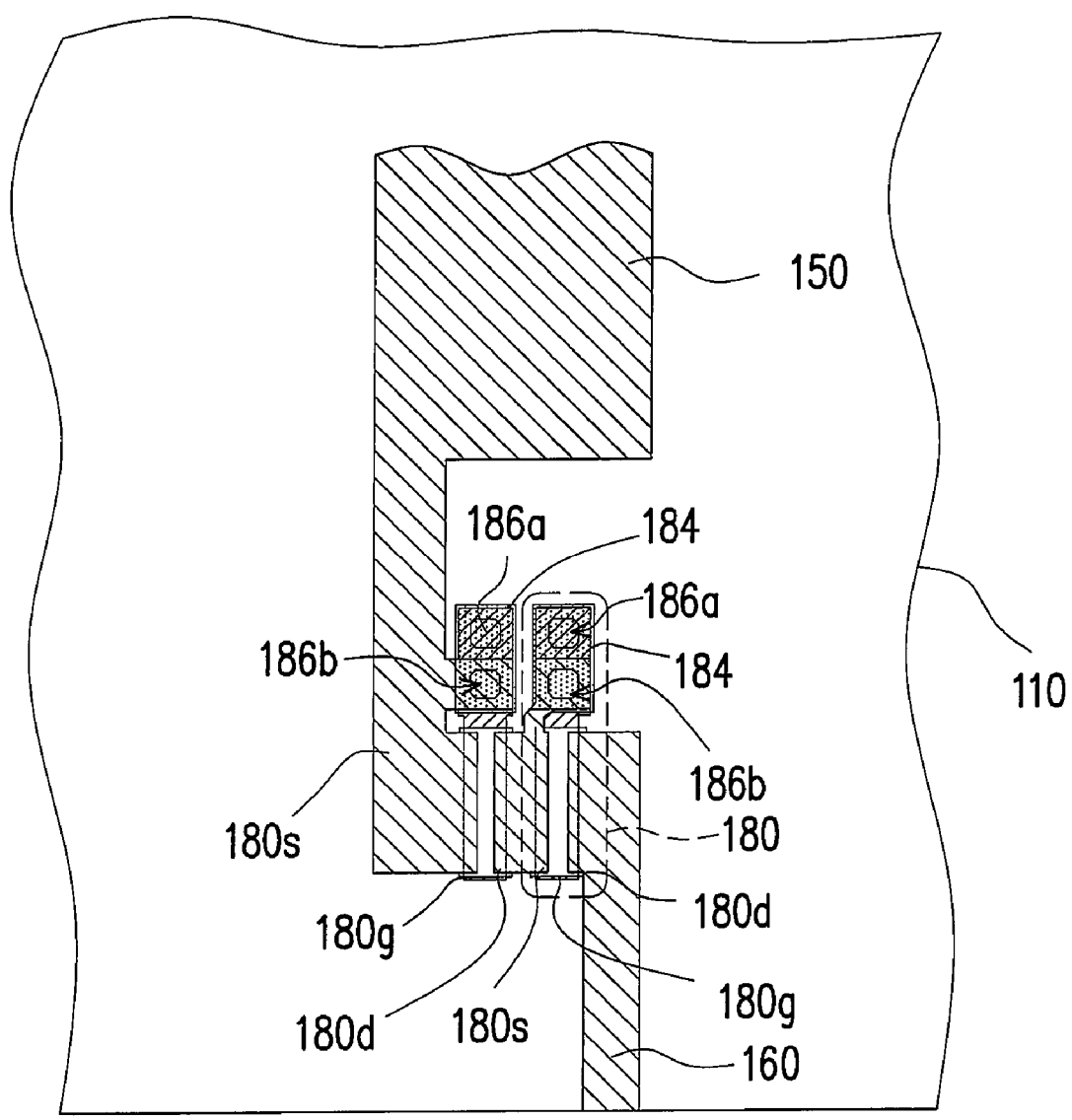
FIG. 4 is a locally-enlarged schematic diagram of an active device array substrate after being cut off according to the second embodiment of the present invention.

FIG. 4 is a locally-enlarged schematic diagram of an active device array substrate after being cut off according to the second embodiment of the present invention. Referring to FIGS. 3 and 4, similarly to the first embodiment, after the test is performed, the connection lines 160 would be cut off. At this time, the connection lines 160 extend to an edge of the substrate 110.

The Third Embodiment

Figure 5:
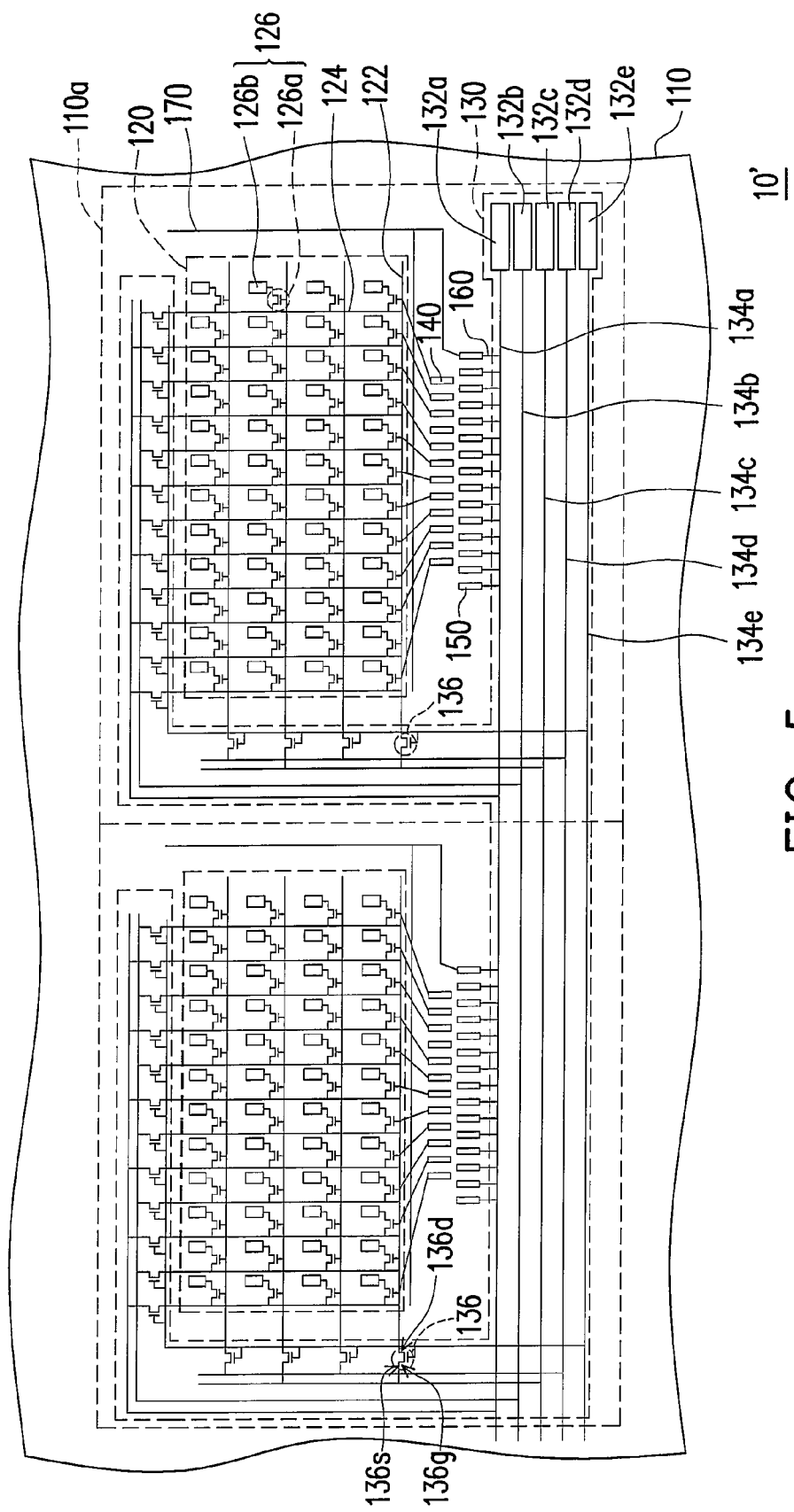
FIG. 5 is a schematic diagram of an active device array substrate prior to being cut off according to the third embodiment of the present invention.

FIG. 5 is a schematic diagram of an active device array substrate prior to being cut off according to the third embodiment of the present invention. Referring to FIG. 5, the present embodiment is similar to the first embodiment except that the substrate 110 of the active device array substrate 10' in the embodiment is divided into a plurality of panel regions 110a and a plurality of active device arrays 120 are respectively disposed on the panel regions 110a. In addition, a part of the FPC pads 150 on each panel region 110a is electrically connected to the detecting circuit 130 via the connection lines 160.

In short, each active device array 120 is electrically connected to the detecting circuit 130 via the inner shorting ring 170, the FPC pads 150 and the connection lines 160. Therefore, when an electrostatic discharge (ESD) occurs, the ESD current is able to flow into the detecting circuit 130, which is able to protect the circuit from ESD damage. Similarly, the uni-directional switch components 180 of the second embodiment can be used in the present embodiment.

In summary, comparing with the prior art, the present invention has at least following advantages:

1. The present invention makes the inner shorting ring electrically connected to the FPC pads, and the FPC pads are further electrically connected to the detecting circuit via the connection lines. Thus, the detecting circuit may serve as an outer shorting ring to protect the circuit from ESD damage.

2. The present invention employs unidirectional switch components disposed between a part of the FPC pads and the connection lines. Thus, during testing, the testing signal is not likely to interfere with the operation of the active device array.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active device array substrate, comprising:
   a substrate;
   an active device array, disposed on the substrate;
   a detecting circuit, disposed on the substrate and electrically connected to the active device array;
   a plurality of driver chip pads, disposed on the substrate and electrically connected to the active device array;
   a plurality of flexible printed circuit pads, disposed on the substrate;
   a plurality of connection lines, disposed on the substrate, wherein each of the connection lines is connected to the corresponding flexible printed circuit pad and the detecting circuit, respectively;

an inner shorting ring, disposed on the substrate, wherein the inner shorting ring is respectively electrically connected to the active device array and any one of the flexible printed circuit pads; and a plurality of uni-directional switch components disposed between a part of the flexible printed circuit pads and the connection lines, wherein each of the uni-directional switch components is connected to any one of the flexible printed circuit pads and any one of the connection lines, and each of the uni-directional switch components comprises:

a gate electrode, electrically connected to any one of the flexible printed circuit pads;

a source electrode, electrically connected to the gate electrode; and a drain electrode, electrically connected to the connection line.

2. The active device array substrate according to claim 1, wherein the detecting circuit comprises a plurality of testing pads and a plurality of testing lines electrically connected to the testing pads, respectively, and the testing pads comprise an even scan line testing pad, an odd scan line testing pad, an even data line testing pad, an odd data line testing pad and a switch testing pad.

3. An active device array substrate, comprising:

a substrate;

an active device array, disposed on the substrate;

a plurality of driver chip pads, disposed on the substrate and electrically connected to the active device array;

a plurality of flexible printed circuit pads, disposed on the substrate;

a plurality of connection lines, disposed on the substrate, wherein each of the connection lines is respectively connected to the flexible printed circuit pads and the connection lines extend to an edge of the substrate;

an inner shorting ring, disposed on the substrate, wherein the inner shorting ring is respectively electrically connected to the active device array and any one of the flexible printed circuit pads; and a plurality of uni-directional switch components electrically connected to a part of the flexible printed circuit pads and any one of the connection lines, respectively, wherein each of the uni-directional switch components comprises:

a gate electrode, electrically connected to any one of the flexible printed circuit pads;

a source electrode, electrically connected to the gate electrode; and a drain electrode, electrically connected to the connection line.

4. An active device array substrate, comprising:

a substrate, divided into a plurality of panel regions;

a plurality of active device arrays, respectively disposed on the panel regions;

a detecting circuit, disposed on the substrate and electrically connected to the active device arrays;

a plurality of driver chip pads, disposed on the panel regions, respectively, and electrically connected to any one of the active device arrays, respectively;

a plurality of flexible printed circuit pads, respectively disposed on the panel regions;

a plurality of connection lines, disposed on the panel regions, respectively, wherein each of the connection lines is respectively connected to any one of the flexible printed circuit pads on each of the panel regions and the detecting circuit;

a plurality of inner shorting rings, disposed on the panel regions, respectively, wherein each of the inner shorting rings is respectively electrically connected to the active device array on the same panel region and any one of the flexible printed circuit pads on the same panel region; and a plurality of uni-directional switch components respectively disposed between a part of the flexible printed circuit pads on each of the panel regions and the connection lines, wherein each of the uni-directional switch components is connected to any one of the flexible printed circuit pads and any one of the connection lines, and each of the directional switch components comprises:

a gate electrode, electrically connected to any one of the flexible printed circuit pads;

a source electrode, electrically connected to the gate electrode; and a drain electrode, electrically connected to the connection line.

5. The active device array substrate according to claim 4, wherein the detecting circuit comprises a plurality of testing pads and a plurality of testing lines respectively electrically connected to the testing pads, and the testing pads comprise an even scan line testing pad, an odd scan line testing pad, an even data line testing pad, an odd data line testing pad and a switch testing pad.

* * * * *